United States Patent
Kamada et al.

(10) Patent No.: US 8,887,758 B2
(45) Date of Patent: Nov. 18, 2014

(54) SOLENOID VALVE CONTROL DEVICE

(75) Inventors: Kazuya Kamada, Nagoya (JP); Kazuya Hirota, Nagoya (JP); Kenji Nakai, Nagoya (JP)

(73) Assignee: Rinnai Corporation, Nagoya-Shi (JP)

( * ) Notice: Subject to any disclaimer, the term of this patent is extended or adjusted under 35 U.S.C. 154(b) by 306 days.

(21) Appl. No.: 13/515,972

(22) PCT Filed: Oct. 20, 2010

(86) PCT No.: PCT/JP2010/068496
§ 371 (c)(1),
(2), (4) Date: Jun. 14, 2012

(87) PCT Pub. No.: WO2011/077818
PCT Pub. Date: Jun. 30, 2011

(65) Prior Publication Data
US 2012/0292543 A1    Nov. 22, 2012

(30) Foreign Application Priority Data
Dec. 21, 2009    (JP) .................................. 2009-289552

(51) Int. Cl.
*F16K 31/02*    (2006.01)
*F16K 37/00*    (2006.01)

(52) U.S. Cl.
CPC ......... *F06K 31/0675* (2013.01); *F16K 37/0075* (2013.01)
USPC ....... 137/554; 251/129.04; 361/155

(58) Field of Classification Search
USPC ............... 251/129.04, 129.15; 137/554; 361/154–155
See application file for complete search history.

(56) References Cited

U.S. PATENT DOCUMENTS

| | | | | |
|---|---|---|---|---|
| 3,403,302 A | * | 9/1968 | Mason | 361/155 |
| 4,663,976 A | * | 5/1987 | Suzuki et al. | 361/154 |
| 4,679,766 A | * | 7/1987 | Cuming | 251/129.04 |
| 4,960,365 A | * | 10/1990 | Horiuchi | 251/129.05 |
| 5,033,508 A | * | 7/1991 | Laverty, Jr. | 251/129.15 |
| 5,452,176 A | * | 9/1995 | Fowler | 361/155 |
| 5,510,951 A | * | 4/1996 | Briedis et al. | 361/154 |
| 5,652,691 A | * | 7/1997 | Fowler | 361/155 |
| 6,810,906 B2 | * | 11/2004 | Tanaka et al. | 251/129.04 |
| 6,948,697 B2 | * | 9/2005 | Herbert et al. | 251/129.04 |
| 7,369,391 B2 | * | 5/2008 | Tanaka et al. | 361/155 |
| 7,403,366 B2 | * | 7/2008 | Melchert et al. | 361/154 |

FOREIGN PATENT DOCUMENTS

| | | |
|---|---|---|
| JP | 01-316583 | 12/1989 |
| JP | 03-051590 | 3/1991 |

* cited by examiner

*Primary Examiner* — John Bastianelli
(74) *Attorney, Agent, or Firm* — Rankin, Hill & Clark LLP

(57) ABSTRACT

A solenoid valve control device is provided with: a first relay connected in series to a drive coil of a solenoid valve between output terminals of a rectifier circuit; a photocoupler configured to output a voltage of a GND level when a current equal to or greater than a predetermined level is flowing in a contact in the first relay and output a voltage of a V5 level when the current equal to or greater than a predetermined level does not flow in the contact in the first relay; and an integration circuit configured to smooth an output voltage Va1 from the photocoupler. When an output voltage from the integration circuit is not greater than a first threshold value, a microcomputer detects that the first relay is in an on state.

3 Claims, 4 Drawing Sheets

SOLENOID VALVE CONTROL DEVICE

TECHNICAL FIELD

The present invention relates to a solenoid valve control device having a function of detecting an action state of a switching element which drives the solenoid valve.

BACKGROUND ART

Hitherto, there has been known a solenoid valve control device in which a switching element and a drive coil for a solenoid valve are connected in series to an output unit which outputs a direct-current voltage after performing a full-wave rectification on an alternating-current voltage output from an alternating-current power source, and the solenoid valve control device is configured to control the valve-open and valve-close of the solenoid by controlling the ON and OFF of the switching element (for example, refer to Japanese Patent Laid-open No. H01-316583).

The solenoid valve control device disclosed in Patent Document 1, a relay is adopted as the switching element and the drive coil for the solenoid valve is connected in parallel to a light-emitting diode in a photocoupler; and a disposition deficiency or the like of a contact to the relay is detected by inputting pulse signals based on the ON and OFF of a light-receiving transistor in the light-emitting diode into a microcomputer.

CITATION LIST

Patent Documents

Japanese Patent Laid-open No. H01-316583

SUMMARY OF INVENTION

Problem to be Solved by the Invention

In the conventional solenoid valve control device mentioned above, the cycle of the pulse signals input into the microcomputer for confirming the operations of the switching element is equivalent to the cycle of a commercial power source. And the shortest cycle of the pulse signals which can be retrieved into the microcomputer is defined by the performance of the microcomputer, the number of pulse signals input into the computer or the like. If the shortest cycle is longer than the cycle of the pulse signals for confirming the operations retrieved into the microcomputer, some of the pulse signals will be skipped in the retrieval, which makes it a problem to retrieve the pulse signals.

It is therefore an object of the present invention to provide a solenoid valve control device capable of detecting with certainty pulse signals for confirming operations of a switching element which is used in controlling the energization of a solenoid valve.

Solution to Problem

To attain an object described above, the present invention provides a solenoid valve control device provided with: a rectifier circuit which is connected to an alternating-current power source and is configured to rectify an alternating-current voltage input from the alternating-current power source and output it through a pair of output terminals; a switching element connected in series to a drive circuit of a solenoid valve between the output terminals of the rectifier circuit; a current detecting circuit configured to output a first voltage when a current equal to or greater than a predetermined level is flowing in the switching element and output a second voltage different from the first voltage when the current equal to or greater than the predetermined level does not flow in the switching element; and a controller configured to detect whether the switching element is on or off according to the output voltage from the current detecting circuit.

As a first aspect of the present invention, the solenoid valve control device is further provided with a smoothing circuit configured to smooth and output the output voltage from the current detecting circuit; and the controller detects that the switching element is on when the output voltage of the smoothing circuit levels between the first voltage and a first threshold value defined between the first voltage and the second voltage.

According to the present invention mentioned above, when the switching element is on (in a connected state), the full-wave or half-wave voltage rectified by the rectifier circuit is applied to the series circuit of the drive circuit of the solenoid valve and the switching element. Therefore, by switching alternatively the state where a current equal to or greater than the predetermined level is flowing in the switching element and the state where the current does not flows in the switching element, it is possible to output a pulse voltage switching alternatively between the first voltage and the second voltage from the current detecting circuit. In this case, since the output of the smoothing circuit is the smoothed pulse voltage, the output value from the smoothing circuit levels between the first voltage and the first threshold value.

On the other hand, when the switching element is off (in a disconnected state), since the current equal to or greater than the predetermined level does not flow in the switching element, the output of the current detecting circuit becomes the second voltage. Therefore, the output from the smoothing circuit levels between the first threshold value and the second voltage.

When the output voltage from the smoothing circuit levels between the first voltage and the first threshold value, the controller can detect that the switching element is in an on state. In this case, since there is no problem in the timing of retrieving the output from the smoothing circuit by the controller, the pulse voltage output from the current detecting circuit will not be skipped in the retrieval. Thereby, the ON state of the switching element can be detected with certainty.

In the first aspect of the present invention, the controller detects that the switching element is off state when the output voltage of the smoothing circuit levels between the second voltage and a second threshold value defined between the first threshold value voltage and the second voltage.

According to the present invention mentioned above, when the output voltage from the smoothing circuit becomes unstable due to the malfunctions in the current detecting circuit, the smoothing circuit or the like and levels around the middle of the first voltage and the second voltage, the ON and OFF state of the switching element can not be detected; by defining a difference present between the first threshold value and the second threshold value, it is possible to improve the reliability of detecting the ON and OFF state of the switching element.

As a second aspect of the present invention, the solenoid valve control device is further provided with a zero cross detecting circuit configured to detect a zero cross point in the alternating-current voltage; and the controller detects that the switching element is in an on state when the output voltage from the current detecting circuit levels between the first voltage and a threshold value defined between the first voltage and the second voltage after a predetermined interval which is determined by supposing that the current flowing in the switching element has been equal to or greater than the predetermined level due to the level increment of the output voltage from the rectifier circuit if the switching element is in the on state has elapsed from a time where a zero cross point of the alternating-current voltage is detected by the zero cross detecting circuit.

According to the present invention mentioned above, when the alternating-current voltage passes the zero cross point, the level of the rectified voltage increases gradually to the peak voltage. Therefore, if the switching element is in the on state, the amount of the current flowing in the switching element increases gradually to the predetermined level or greater. Thereby, when the output voltage from the current detecting circuit levels between the threshold value and the first voltage after the predetermined interval has elapsed from the time where the zero cross point of the alternating-current voltage is detected, the pulse voltage output from the current detecting circuit will not be skipped in the retrieval. Thereby, the ON state of the switching element can be detected with certainty.

DETAILED DESCRIPTION OF THE PREFERRED EMBODIMENTS

Hereinafter, an embodiment of the present invention will be described with reference to FIG. 1 to FIG. 4.

[First Embodiment]

A first embodiment of the present invention will be described with reference to FIG. 1 and FIG. 2.

Figure 1:
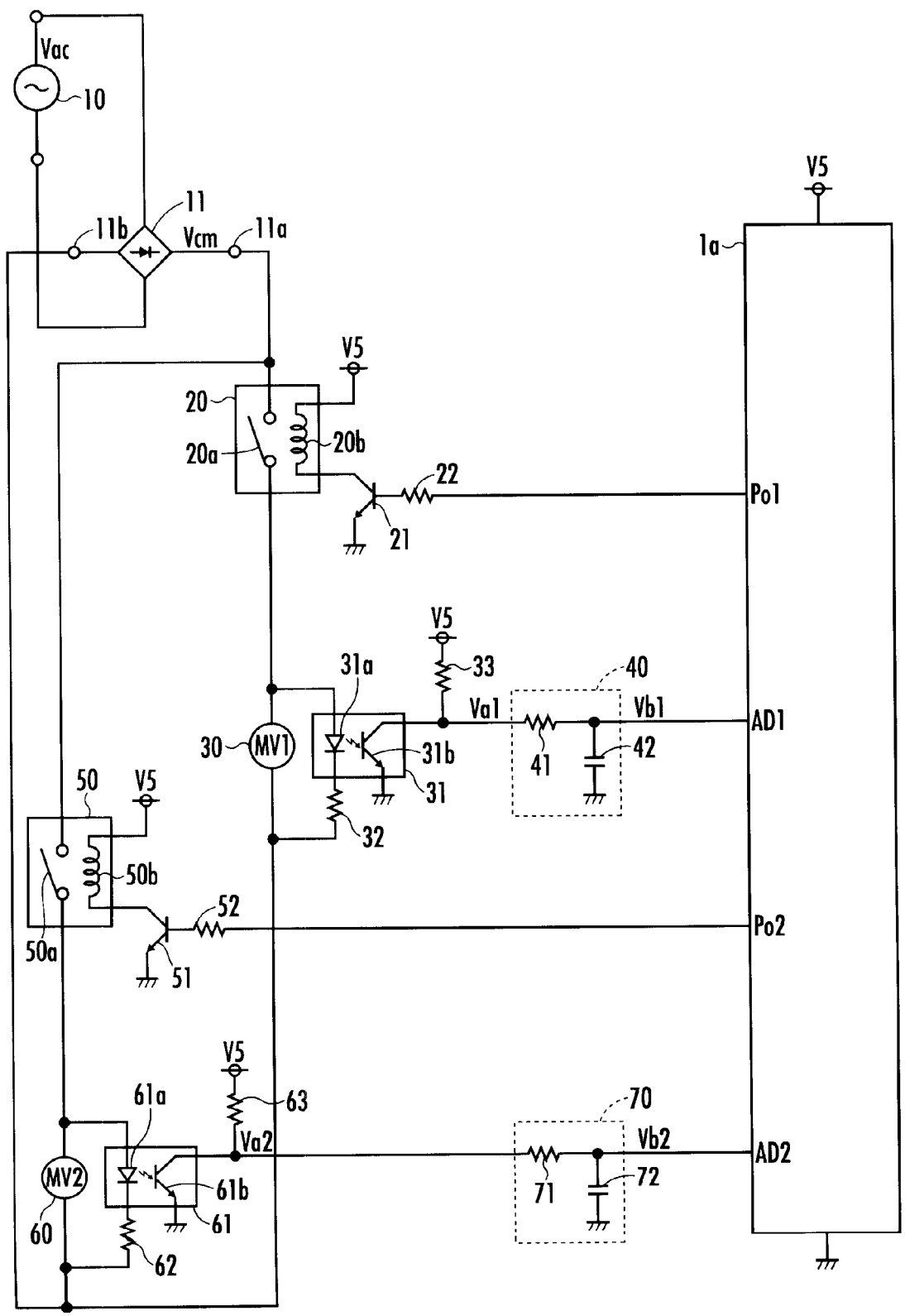
FIG. 1 is a configuration diagram of a circuit of a solenoid valve control device according to a first embodiment of the present invention.

With reference to FIG. 1, a solenoid valve control device of the first embodiment is configured to control actions (valve-open or valve-close) of a first solenoid valve 30 (equivalent to a switching element in the present invention) and a second solenoid valve 60 via a microcomputer 1a. The microcomputer 1a functions as a controller of the present invention by executing a control program of the solenoid valve stored in a memory (not shown).

The solenoid control device of the first embodiment is provided with a rectifier circuit 11 (diode bridge) configured to full-wave rectify an alternating-current voltage Vac output from an alternating-current power source 10. A contact 20a of a first relay 20 (equivalent to the switching element in the present invention) and a drive coil (equivalent to a drive circuit of the solenoid valve in the present invention. not shown) of the first solenoid valve 30 are connected in series between output terminals 11a and 11b of the rectifier circuit 11; and meanwhile, a contact 50a of a second relay 50 (equivalent to the switching element in the present invention) and a drive coil (equivalent to a drive circuit of the solenoid valve in the present invention) of the second solenoid valve 60 are connected in series therebetween.

A drive coil 20b of the first relay 20 is configured to have one end connected to V5 (a line to a power source of DC 5V) and the other end connected to GND via a transistor 21. The base of the transistor 21 is connected to an output port Po1 of the microcomputer 1a via a resistor 22. Thereby, when the output level of the output port Po1 is High (at a V5 level), the transistor 21 is switched on (connected state) and the contact 20a of the first relay 20 is switched on (connected state) to switch the first solenoid valve 30 to the ON state (valve-open state).

On the other hand, when the output level of the output port Po1 of the microcomputer 1a is Low (at a GND level), the transistor 21 is switched off (disconnected state) and the contact 20a of the first relay 20 is switched off (disconnected state) to switch the first solenoid valve 30 to the OFF state (valve-close state).

A series circuit composed of a light-emitting diode 31a in a photocoupler 31 and a resistor 32 is connected in parallel to the drive coil of the first solenoid valve 30. A collector of a light-receiving transistor 31b in the photocoupler 31 is connected to V5 (a line to a power source of DC 5V) via a resistor 33. An emitter of the light-receiving transistor 31b is connected to GND.

The collector of the light-receiving transistor 31b is connected to an AD (analogue-digital conversion) input port AD1 of the microcomputer 1a via an integration circuit 40 (equivalent to a smoothing circuit in the present invention) composed of a resistor 41 and a condenser 42. Thereby, an output voltage Vb1 from the integration circuit 40 is converted into a digital value and retrieved by the microcomputer 1a.

Similar to the first relay 20, a drive coil 50b of the second relay 50 is configured to have one end connected to V5 (a line to a power source of DC 5V) and the other end connected to GND via a transistor 51. The base of the transistor 51 is connected to an output port Po2 of the microcomputer 1a via a resistor 52. Thereby, when the output level of the output port Po2 is High (at a V5 level), the transistor 51 is switched on (connected state) and the contact 50a of the second relay 50 is switched on (connected state) to switch the second solenoid valve 60 to the ON state (valve-open state).

On the other hand, when the output voltage level of the output port Po2 of the microcomputer 1a is Low (at a GND level), the transistor 51 is switched off (disconnected state) and the contact 50a of the second relay 50 is switched off (disconnected state) to switch the second solenoid valve 60 to the OFF state (valve-close state).

A series circuit composed of a light-emitting diode 61a in a photocoupler 61 and a resistor 62 is connected in parallel to the drive coil of the second solenoid valve 60. A collector of a light-receiving transistor 61b in the photocoupler 61 is connected to V5 (a line to a power source of DC 5V) via a resistor 63. An emitter of the light-receiving transistor 61b is connected to GND.

The collector of the light-receiving transistor 61b is connected to an AD (analogue-digital conversion) input port AD2 of the microcomputer 1a via an integration circuit 70 (equivalent to a smoothing circuit in the present invention) composed of a resistor 71 and a condenser 72. Thereby, an output voltage Vb2 from the integration circuit 70 is converted into a digital value and retrieved by the microcomputer 1a. The photocoupler 31 and the resistors 62 and 63 constitute a current detecting circuit in the present invention.

Hereinafter, with reference to FIG. 2, the descriptions will be carried out on a confirmation process performed by the microcomputer 1a to confirm the operations of the first relay 20.

Figure 2:
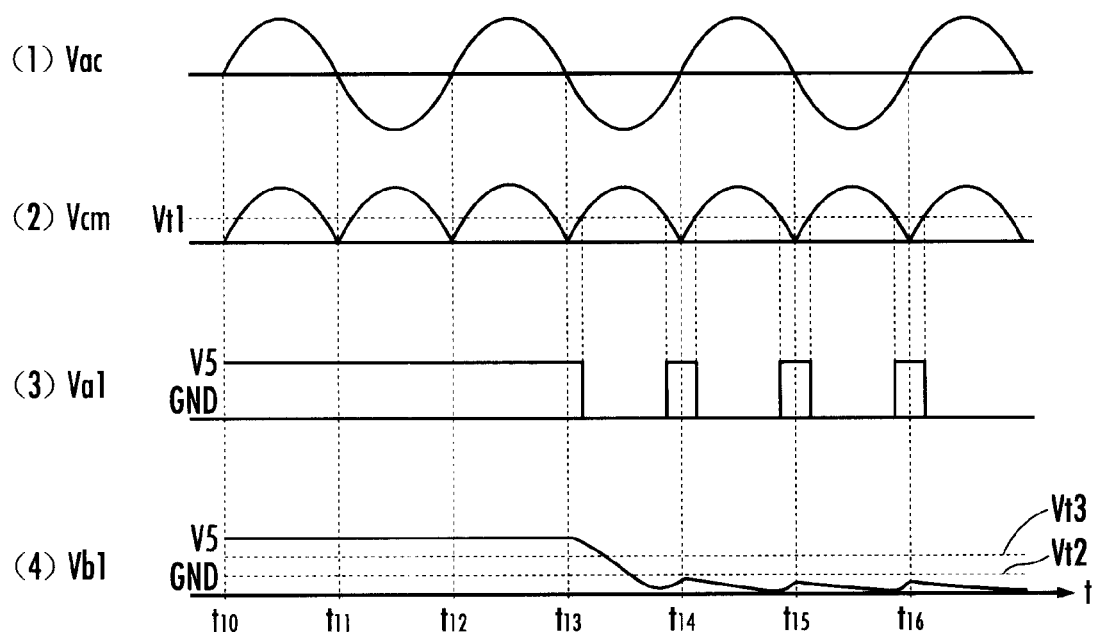
FIG. 2 is a timing chart of the circuit illustrated in FIG. 1.

FIG. 2 is a timing chart in which fluctuations of (1) the output voltage Vac from the alternating-current power source 10, (2) an output voltage Vc from the rectifier circuit 11, (3) an output voltage (voltage of the collector in the light-receiving transistor 31b) Va1 from the photocoupler 31, and (4) the output voltage Vb1 from the integration circuit 40 are illustrated in the same time axis t.

On a condition that the first relay 20 is switched on and the output voltage Vcm from the rectifier circuit 11 applied to the drive coil of the first solenoid valve 30 is not lower than a threshold voltage Vt1 defined within the amplitude range of the output voltage Vcm, the photocoupler 31 is configured to switch on the light-receiving transistor 31b. In addition, when the output voltage Vcm from the rectifier circuit 11 is equal to the threshold voltage Vt1, the level of a current flowing in the contact 20a of the first relay 20 is equivalent to the predetermined level in the present invention.

When the light-receiving transistor 31b is off state, the output voltage Va1 from the photocoupler 31 is equal to the V5 level (equivalent to a second voltage in the present invention); and when the light-receiving transistor 31b is in an on state, the output voltage Va1 from the photocoupler 31 is equal to the GND level (equivalent to a first voltage in the present invention).

It is also acceptable that the output voltage Va1 from the photocoupler 31 is equal to the voltage of GND level (equivalent to the second voltage in the present invention) when the light-receiving transistor 31b is off state, and the output voltage Va1 from the photocoupler 31 is equal to the voltage of V5 level (equivalent to the first voltage in the present invention) when the light-receiving transistor 31b is in the on state.

Here, FIG. 2 illustrates a case where the microcomputer 1a is configured to set the output of the output port Po1 at Low (GND level, off-control of the first solenoid valve 30) in the interval from $t_{10}$ to $t_{13}$ and set the output of the output port Po1 at High (DC 5V level, on-control of the first solenoid valve) in the interval from $t_{13}$ to $t_{16}$.

In the interval from $t_{10}$ to $t_{13}$, the contact 20a of the first relay 20 is switched off, since the light-emitting diode 31 of the photocoupler 31 is not energized, the light-receiving transistor 31b of the photocoupler 31 is in the OFF state. Therefore, the output voltage Va1 from the photocoupler 31 becomes constant at the voltage of V5 level and the output voltage Vb1 from the integration circuit 40 becomes equal to the voltage of V5 level as well.

On the contrary, when the contact 20a of the first relay 20 is switched on at $t_{13}$, the output voltage Vcm from the rectifier circuit 11 is applied to the series circuit composed of the light-emitting diode 31a of the photocoupler 31 and the resistor 32, the light-emitting diode 31a is energized and the light-receiving transistor 31b is switched on when the output voltage Vcm is not lower than the threshold value Vt1. However, if the output voltage Vcm is lower than the threshold value Vt1, the light-receiving transistor 31b is switched off.

Therefore, in the interval from $t_{13}$ to $t_{16}$, the output voltage Va1 from the photocoupler 31 is of a pulse output with the level thereof alternated between V5 and GND. The outtput voltage Vb1 of the integration circuit 40 is of a roughly constant voltage with the pulse output Va1 being smoothed.

When the output voltage Vb1 from the integration circuit 40 which is retrieved from the AD input port AD1 is not higher than a first threshold value Vt2, the microcomputer 1a determines that the first relay 20 is in the ON state (the contact 20a in the first relay 20 is in the connected state).

In this case, if the first relay 20 functions normally to switch on the contact 20a, the output voltage Vb1 from the integration circuit 40 is always not higher than the first threshold value Vt2, the normal operations of the first relay 20 can be detected with certainty without depending on the retrieving timing of the output voltage Vb1 from the AD input port AD1.

When the output voltage Vb1 of the integration circuit 40 which is retrieved from the AD input port AD1 is not less than a second threshold value Vt3 which is defined higher than the first threshold value Vt2, the microcomputer 1a determines that the first relay 20 is in the OFF state (the contact 20a of the first relay 20 is in the disconnected state).

Thus, by defining a difference between the first threshold value Vt2 used to determine the ON state of the first relay 20 and the second threshold value Vt3 used to determine the OFF state of the first relay 20, when the output voltage Vb1 from the integration circuit 40 is present between the first threshold value Vt2 and the second threshold value Vt3 due to the malfunctions of the photocoupler 31 and the integration circuit 40, it is possible for the microcomputer 1a to recognize that the detection of the ON and OFF state of the first relay 20 is impossible.

The first threshold voltage Vt2 is defined to have the output voltage Vb1 of the integration circuit 40, at which the first relay 20 is experimentally measured to function normally to switch on the contact 20a, added with a fluctuation margin caused by noises, irregular variations of circuits and the like. Similarly, the second threshold value Vt3 is defined to have the output voltage Vb1 of the integration circuit 40, at which the first relay 20 is experimentally measured to function normally to switch off the contact 20a, added with a fluctuation margin caused by noises, irregular variations of circuits and the like.

If each circuit functions normally, the output voltage Vb1 of the integration circuit 40 will never be present between the first threshold value Vt2 and the second threshold value Vt3. Therefore, it is acceptable that an error notification is configured to be output when the output voltage Vb1 of the integration circuit 40 is present between the first threshold value Vt2 and the second threshold value Vt3. Based on the error notification, it is possible to make a user recognize that the circuit has encountered malfunctions and thereby prompt the user to take relative responses.

Regarding the second relay 50, similar to the first relay 20, the ON state of the second relay 50 can be detected according to whether or not the output voltage Vb2 from the integration circuit 70 which is retrieved from the AD input port AD2 is not higher than the first threshold value Vt2 when the second relay 50 is controlled on.

[Second Embodiment]

A second embodiment of the present invention will be described with reference to FIG. 3 and FIG. 4.

Figure 3:
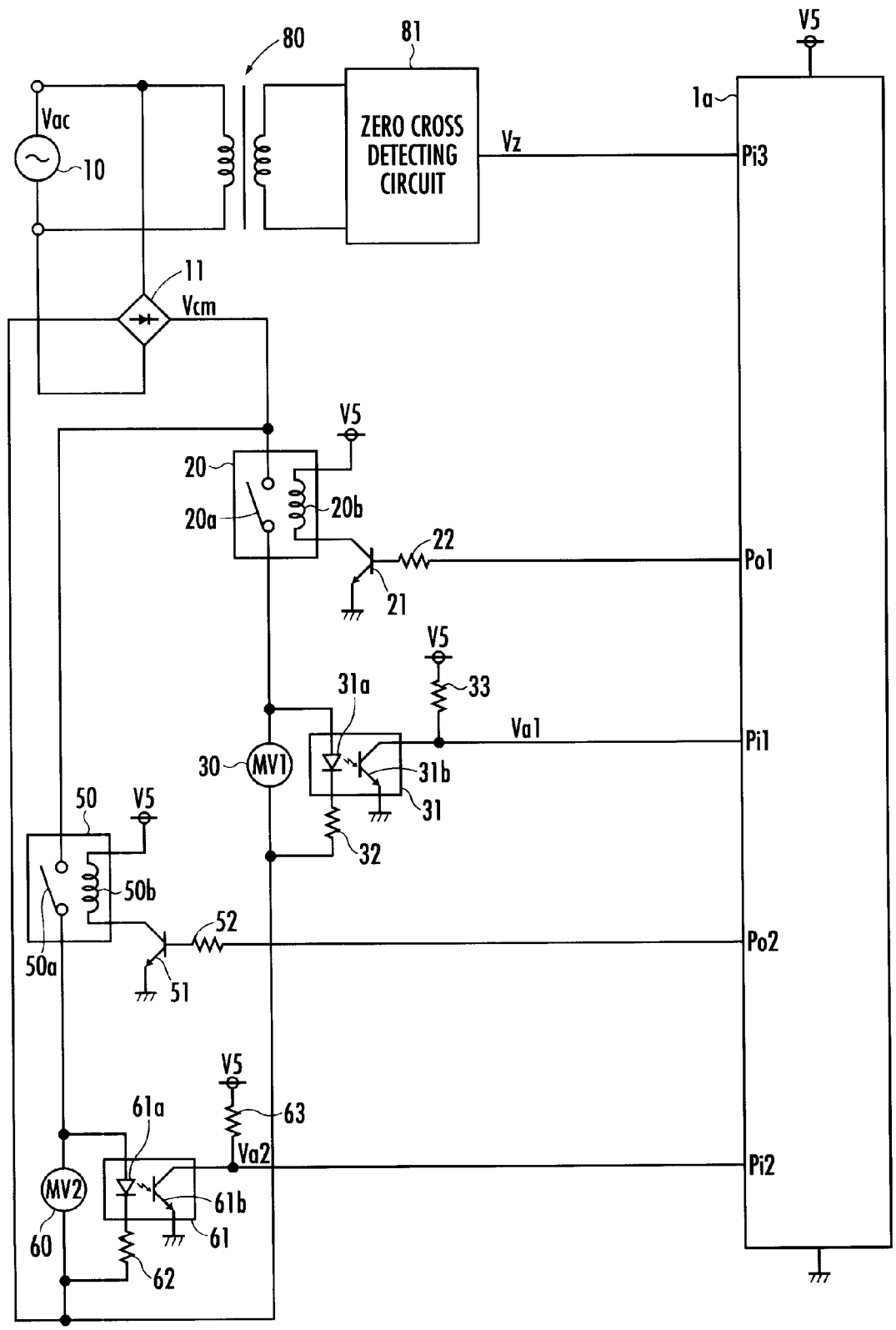
FIG. 3 is a configuration diagram of a circuit of a solenoid valve control device according to a second embodiment of the present invention.

With reference to FIG. 3, a solenoid valve control device of the second embodiment is configured to control actions (valve-open or valve-close) of a first solenoid valve 30 and a second solenoid valve 60 via a microcomputer 1b. The microcomputer 1b functions as a controller of the present invention by executing a solenoid value control program stored in a memory.

The solenoid valve control device of the second embodiment is provided with a transformer 80 configured to step down an output voltage Vac from an alternating-current power source 10 and a zero cross detecting circuit 81 configured to detect a zero cross point of Vac (the point where Vac switches from plus to minus or from minus to plus) from the output voltage Ve of the transformer 80 and output a zero cross detecting signal Vz. However, the integration circuits 40 and 70 disposed in the solenoid valve control device of the first embodiment above are not disposed in the solenoid valve control device of the second embodiment. The other components in the solenoid control device of the second embodiment are identical to those in the solenoid valve control device of the first embodiment; thereby, they are given with the same numerals and descriptions thereof are omitted.

Hereinafter, with reference to FIG. 4, the descriptions will be carried out on a confirmation process performed by the microcomputer 1b to confirm the operations of the first relay 20.

Figure 4:
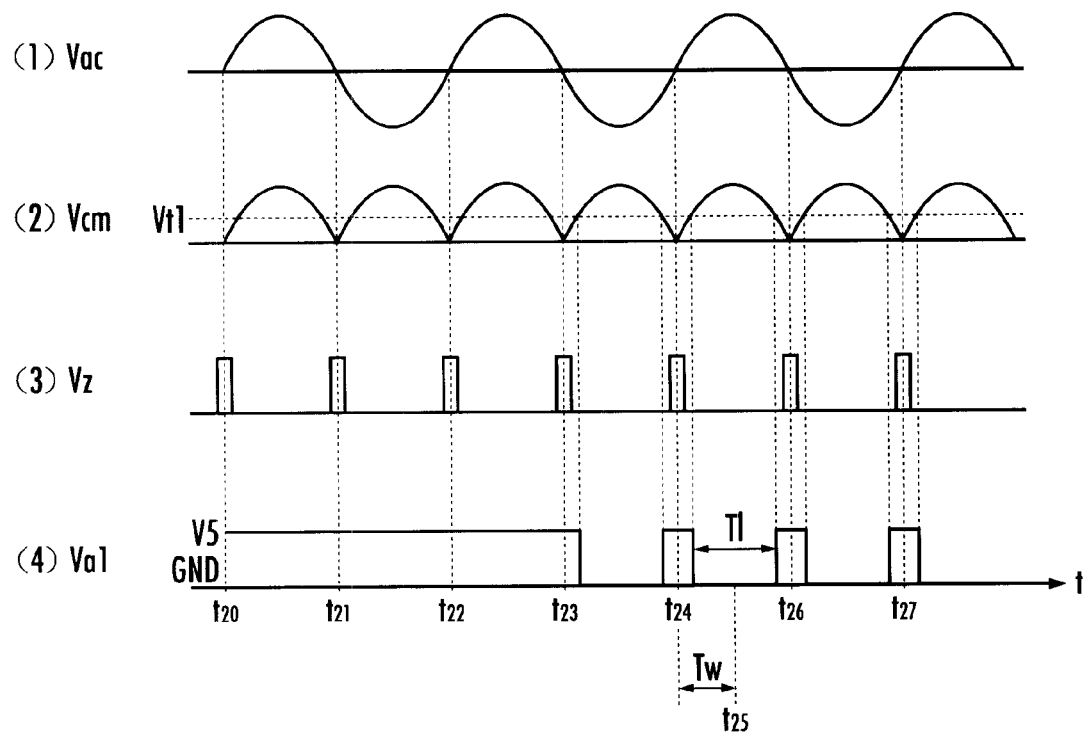
FIG. 4 is a timing chart of the circuit illustrated in FIG. 3.

FIG. 4 is a timing chart in which fluctuations of (1) the output voltage Vac from the alternating-current power source 10, (2) an output voltage Vc from the rectifier circuit 11, (3) an output voltage (the zero cross detecting signal) Vz from the zero cross detecting circuit 81, and (4) the output voltage Va1 from the photocoupler 31 are illustrated in the same time axis t.

FIG. 4 illustrates a case where the microcomputer 1b is configured to set the output of the output port Po1 at Low (GND level, off-control of the first solenoid valve 30) in the interval from $t_{20}$ to $t_{23}$ and set the output of the output port Po1 at High (DC 5V level, on-control of the first solenoid valve) in the interval from $t_{23}$ to $t_{27}$.

In the interval from $t_{20}$ to $t_{23}$, the contact 20a of the first relay 20 is switched off, since the light-emitting diode 31 of the photocoupler 31 is not energized, the light-receiving transistor 31b of the photocoupler 31 is in the OFF state. Therefore, the output voltage Va1 from the photocoupler 31 becomes constant at the voltage of V5 level.

On the contrary, when the contact 20a of the first relay 20 is switched on at $t_{23}$, the output voltage Vcm from the rectifier circuit 11 is applied to the series circuit composed of the light-emitting diode 31a of the photocoupler 31 and the resistor 32, the light-emitting diode 31a is energized and the light-receiving transistor 31b is switched on when the output voltage Vcm is not lower than the threshold value Vt1. However, if the output voltage Vcm is lower than the threshold value Vt1, the light-receiving transistor 31b is switched off. Therefore, in the interval from $t_{23}$ to $t_{27}$, the output voltage Va1 from the photocoupler 31 is of a pulse output with the level thereof alternated between V5 and GND.

As obviously seen from the relationship between the zero cross detecting signal (3) and the output voltage Va1 from the photocoupler 31 (4) of FIG. 4, the output voltage Va1 becomes equal to the voltage of V5 level around the zero cross point. Therefore, the microcomputer 1b retrieves the output voltage Va1 of the photocoupler 31 from an input port Pi1 at $t_{25}$ after a waiting time interval Tw has elapsed from the time (around $t_{24}$. It may be set around $t_{26}$ or $t_{27}$ as well) where the zero cross detecting signal Vz input to an input port Pi3 is detected to increase to a time in a time interval T1 which is determined supposing that the output voltage Va1 from the photocoupler 31 becomes equal to the voltage of GND level when the first solenoid valve 30 is in the ON-control state.

As mentioned above, if the first relay 20 is in the ON state, at $t_{25}$ where the output voltage Va1 from the photocoupler 31 becomes equal to the voltage of GND level, the ON state of the contact 20a in the first relay 20 can be detected with certainty according to the retrieval of the output voltage Va1 from the photocoupler 31.

Moreover, when the microcomputer 1b is setting the output from the output port Po1 at Low (the off-control of the first solenoid valve 30), when the output voltage Va1 from the photocoupler 31 retrieved from the input port Pi1 around the zero cross point becomes equal to the voltage of GND level, the contact 20a of the first relay 20 may be determined as being in the malfunctioned ON state and an error notification or the like may be performed.

Regarding the second relay 50, similar to the first relay 20, the ON state of the second relay 50 can be detected according to the retrieval of the output voltage Va2 of the photocoupler 61 from the input port Pi2 after the waiting time interval Tw has elapsed from the time where the zero cross point in the output voltage Vac from the alternating-current power source 10 has been detected according to the zero cross detecting signal Vz input to the input port Pi3 when the second solenoid valve 50 is in the ON-control state.

In the present embodiment, the first relay 20 and the second relay 50 are used as a switching element of the present invention; however, it is acceptable to use a transistor or a FET as the switching element of the present invention.

Industrial Applicability

As mentioned above, the solenoid valve control device of the present invention can detect with certainty the pulse signals for confirming the operations of the switching element which is used to drive the solenoid valve; therefore, it is useful in confirming the control state of the solenoid valve.

Description Of Reference Numerals 1a, 1b: Microcomputer; 10: Alternating-current power source; 11: Rectifier circuit (diode bridge); 20: First relay; 30: First solenoid valve; 31: Photocoupler; 40: Integration circuit; 50: Second relay; 60: Second solenoid valve; 61: Photocoupler; 70: Integration circuit; and 81: Zero cross detecting circuit

The invention claimed is:

1. A solenoid valve control device provided with:
   a rectifier circuit which is connected to an alternating-current power source and is configured to rectify an alternating-current voltage input from the alternating-current power source and output it through a pair of output terminals;
   a switching element connected in series to a drive circuit of a solenoid valve between the output terminals of the rectifier circuit;
   a current detecting circuit configured to output a first voltage when a current equal to or greater than a predetermined level is flowing in the switching element and output a second voltage different from the first voltage when the current equal to or greater than the predetermined level does not flow in the switching element; and
   a controller configured to detect whether the switching element is in an on state or off state according to the output voltage from the current detecting circuit,
   wherein the solenoid valve control device is further provided with a smoothing circuit configured to smooth and output the output voltage from the current detecting circuit; and
   the controller detects that the switching element is in the on state when the output voltage from the smoothing circuit levels between the first voltage and a first threshold value defined between the first voltage and the second voltage.

2. The solenoid valve control device according to claim 1, wherein
   the controller detects that the switching element is off state when the output voltage from the smoothing circuit levels between the second voltage and a second threshold value defined between the first threshold value and the second voltage.

3. A solenoid valve control device provided with:
   a rectifier circuit which is connected to an alternating-current power source and is configured to rectify an alternating-current voltage input from the alternating-current power source and output it through a pair of output terminals;

a switching element connected in series to a drive circuit of a solenoid valve between the output terminals of the rectifier circuit;

a current detecting circuit configured to output a first voltage when a current equal to or greater than a predetermined level is flowing in the switching element and output a second voltage different from the first voltage when the current equal to or greater than the predetermined level does not flow in the switching element; and a controller configured to detect whether the switching element is in an on state or off state according to the output voltage from the current detecting circuit, wherein the solenoid valve control device is further provided with a zero cross detecting circuit configured to detect a zero cross point in the alternating-current voltage; and the controller detects that the switching element is in the on state when the output voltage from the current detecting circuit levels between the first voltage and a threshold value defined between the first voltage and the second voltage after a predetermined interval which is determined by supposing that the current flowing in the switching element has been equal to or greater than the predetermined level due to the level increment of the output voltage from the rectifier circuit if the switching element is in the on state has elapsed from a time where a zero cross point is detected in the alternating-current voltage by the zero cross detecting circuit.

\* \* \* \* \*